Dec. 31, 1968  O. R. STARKEY  3,418,791
ROLLER COMPRESSING APPARATUS FOR MECHANICAL PICKERS
Original Filed Nov. 8, 1966
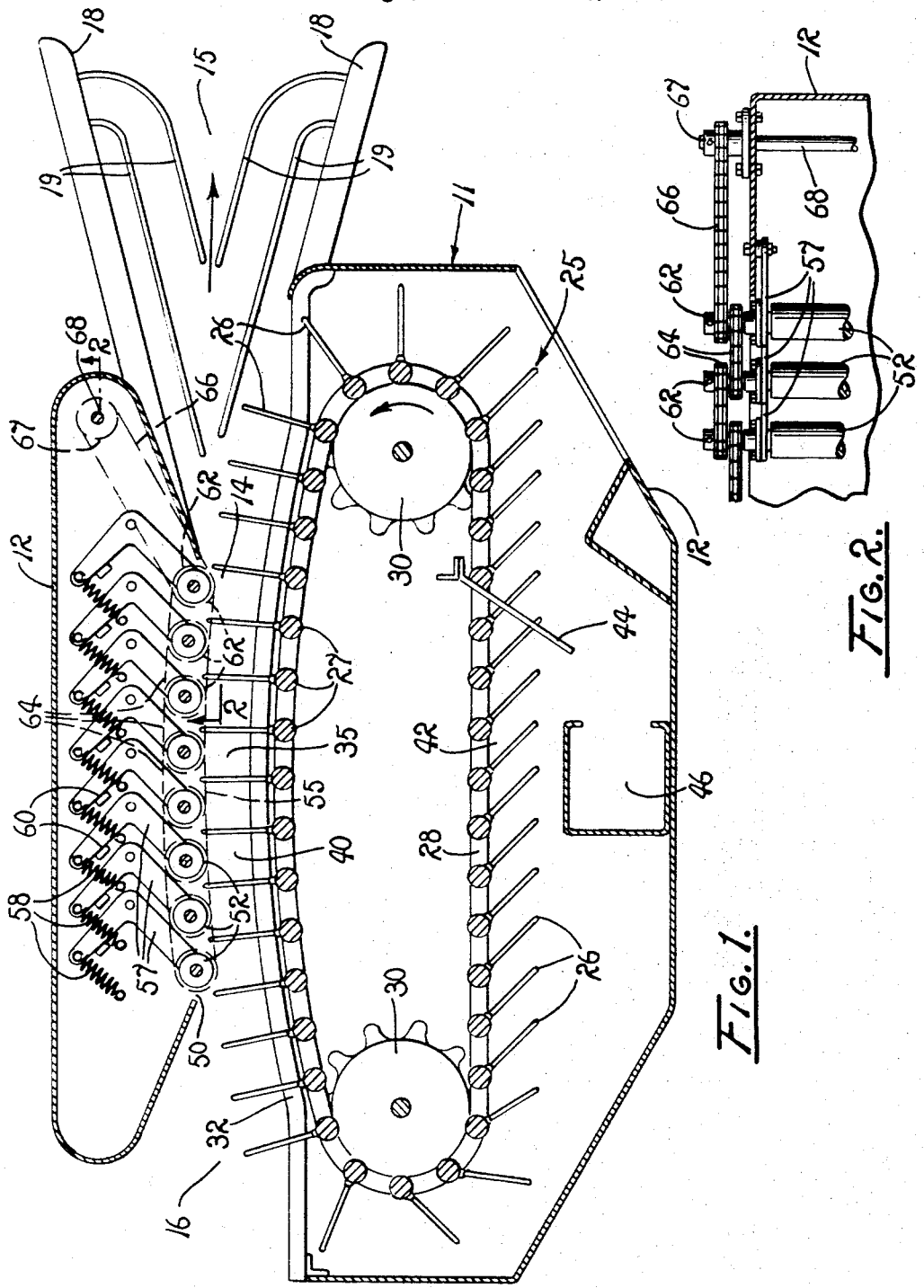
ORVAL R. STARKEY
INVENTOR
Huebner & Worrel
ATTORNEYS United States Patent Office 3,418,791
Patented Dec. 31, 1968

3,418,791
ROLLER COMPRESSING APPARATUS FOR
MECHANICAL PICKERS
Orval R. Starkey, Fresno, Calif., assignor of fifty percent to Anthony L. Lourenco, Fresno, Calif.
Original application Nov. 8, 1966, Ser. No. 600,333, now Patent No. 3,349,550, dated Oct. 31, 1967. Divided and this application Oct. 30, 1967, Ser. No. 679,039
7 Claims. (Cl. 56—42)

ABSTRACT OF THE DISCLOSURE

A plant compressing apparatus for a mobile mechanical picker for cotton and the like having a plurality of power driven picking spindles traveled through a picking zone within the picker in a relative direction opposite to the direction of picker movement including a plurality of plant compressing members having substantially aligned peripheral portions providing a movable surface in opposed relation to the spindles for travel with the spindles through the picking zone.

*Cross reference to related application*

This application is a divisional application of application Ser. No. 600,333, entitled, "Plant Compressing Apparatus for Mechanical Pickers," filed Nov. 8, 1966, resulting in Patent No. 3,349,550 issued Oct. 31, 1967.

*Background of the invention*

Conventional cotton pickers normally employ substantially stationary plant compressing plates in laterally opposed spaced relation to a plurality of rows of barbed picking spindles which are traveled longitudinally of the rows of plants within the picking zone of the pickers. The compressing plates are usually resiliently mounted for lateral movement within the picking zone to urge the plants passing therethrough toward the spindles. As the plants progress through the picker, they slide against the compressing plate in position for the cotton bolls thereon to be engaged by the spindles. However, such conventional compressing plates impose considerable drag on the plants which tends to bend them forwardly with respect to the direction of picker movement, thus impairing picking efficiency. Furthermore, such relative sliding movement between the compressing plate and the plants has a tendency to break the more brittle plant stalks and leaves and to shove the remaining portions of the stalk against the sides of the barbed spindles which grind away minute fibers therefrom, causing intermixing of such extraneous material with the harvested cotton which is virtually impossible to remove by ginning. This also greatly accelerates wear on the spindles, imposes considerable drag against spindle movement, requires more power to move the picking unit through the field, and prevents straightening of the spindles within the picking zone which impairs penetration of the spindles into the cotton bolls. Furthermore, fields of cotton are normally picked several times in a season with the early picking encountering a large number of green or immature cotton bolls on the plants. Such immature bolls must be preserved on the plants so that they may ripen to full maturity for subsequent picking. During such picking, the relative sliding movement between the plants and the compressing plate causes a large number of such immature bolls to be knocked loose from the plants which results in a significant loss to the cotton grower. Presently, in order to reduce such losses, growers frequently resort to chemically treating the plants to cause premature defoliation for accelerating the opening of such immature bolls and to remove the leaves from picker interference. However, the defoliation process is not only costly but produces an inferior grade of cotton from the immature bolls, shortens the growing season and has an adverse effect on the tensile strength of the cotton fibers from even the mature bolls. Additionally, the bruising, rupturing, and tearing of the green bolls and other portions of the plants release plant sap and wax which accumulate on the spindles and other picking mechanisms to impair picking efficiency, require frequent cleaning, and reduce the quality of the picked cotton by staining.

*Summary of the invention*

Accordingly, it is an object of the present invention to provide an improved plant compressing apparatus for cotton pickers and the like.

Another object is to provide such an improved plant compressing apparatus which affords more efficient picking of mature cotton bolls with substantially less damage to the picked cotton than heretofore possible with conventional pickers.

Another object is to provide a plant compressing apparatus of the character described which minimizes the dropping and damage to unpicked, immature cotton bolls.

Another object is to provide such an improved plant compressing apparatus which minimizes damage to the branches and stalks of the plants so as to reduce the trash content of the harvested cotton.

Another object is to provide an improved plant compressing apparatus which virtually eliminates the need for present plant defoliation practices.

Another object is to provide a plant compressing apparatus which is driven in predetermined synchronized relation to the spindles of a cotton picker and with earth traversing movement so as to remain substantially stationary with respect to the plants in the picking zone.

Other objects and advantages of the present invention will become more clearly apparent upon reference to the following description in the specification.

*Brief description of the drawing*

FIG. 1 is a top plan view of a plant compressing apparatus embodying the principles of the present invention shown adapted to the picking unit of a cotton picker.

FIG. 2 is a fragmentary transverse vertical section through the plant compressing apparatus, taken on line 2—2 of FIG. 1.

*Description of the preferred embodiment*

Referring more particularly to the drawing, a plant compressing apparatus embodying the principles of the present invention is generally indicated by the reference numeral 10. As best shown in FIG. 1, the plant compressing apparatus is mounted within a picking unit 11 of a mobile cotton picking machine having a housing 12. The picking unit provides an elongated rectilinear plant passage 14 therethrough adapted to be aligned with rows of plants and having opposite inlet and outlet ends 15 and 16, respectively. A pair of forwardly outwardly divergently extended side plates 18 are mounted at the inlet end 15 of the passage which carries pairs of laterally opposed plant lifting fingers 19 which serve as initial guiding members to lift the lower portions of the cotton plants and to guide them through the picking unit in the well-known manner.

The picking unit 11 is provided with a picking assembly 25 having a plurality of horizontally vertically spaced rows of picking spindles 26 mounted on substantially upright spindle bars 27. The bars are individually borne by endless chains 28 which are mounted for circuitous travel about a pair of spaced sprocket drums 30. A plurality of elongated grid bars 32 are mounted in longitudinally coextensive curvilinear relation with respect to the passage 14 in the housing 12 in the intervals between the horizontal rows of spindles 26. The grid bars define one side of a picking zone 35 within the passage 14 of the housing of the picking unit 11.

The picking assemblies 25 further include a picking run 40 extended into the picking zone 35 and an opposite doffing run 42. A plurality of stripping bars 44 are angularly disposed with respect to the direction of travel of the spindles 26 adjacent to the doffing run 42 thereof to remove entwined cotton from the spindles. The doffed cotton is removed from the housing through a pneumatic conveyor pipe fragmentarily shown at 46. The sprocket drums 30 are power driven from a source on the picking machine, not shown, to drive the picking assemblies 25 in a counterclockwise direction, as shown in FIG. 1. As a result, the spindles 26 are driven within the picking zone 35 in a substantially rectilinear path from the inlet end 15 of the passage to the outlet 16 thereof. As is well known, the spindles are traveled rearwardly in the picker at substantially the same speed as the picker travels over the ground so as to remain stationary with respect to the plants during picking operations.

The housing 1 further includes a lateral opening 50 adjacent to the picking zone 35. A plurality of equally spaced substantially upright parallel rollers 52 are disposed within the opening 50 so as to present a movable wall 55 in coextensive curvilinear conforming relation adjacent to the ends of the picking spindles 26 defining an opposite side of the picking zone 35 spaced from the grid bars 32. The rollers are individually mounted on bell cranks 57 pivotally mounted intermediate their ends in the housing which are urged toward the spindles by a plurality of tension springs 58 individually connected between the housing and the opposite ends of each bell crank. A plurality of stop members 60 are secured to the housing in interfering individual abutting relation with the opposite ends of each bell crank to limit outward travel of the rollers farther into the picking zone. Each of the rollers mounts a pair of vertically spaced sprockets 62 thereon with adjacent sets of sprockets mounting endless chains 64 for successively driving the rollers 52 so that their peripheral portions disposed within the picking zone all move in a direction from right to left, as viewed in FIG. 1. The forwardmost roller sprocket 62 is driven through a drive chain 66 disposed about a drive sprocket 67 carried by a drive shaft 68 journaled in the housing and connected to a power source on the picking unit 11, not shown.

*Operation*

The operation of the described embodiment of the subject invention is believed to be clearly apparent and is briefly summarized at this point. The picking unit 11 being carried on a self-propelled vehicle, not shown, traverses a row of cotton plants aligned with the plant passage 14. During such travel, the plant lifting fingers 19 lift the lower branches of the individual plants and guide them toward the inlet end 15 of the plant passage. Progressive ground traversing movement of the picking unit causes the plants to be engaged by the picking spindles 26 and moved within the picking zone 35 in a substantially upright optimum picking attitude. The plants are concurrently engaged by the movable wall 55 formed by tangentially aligned inner peripheries of the rollers 52 which, like the spindles, are traveled at the same speed as the forward earth traversing movement of the picking unit so that the wall remains stationary with respect to the plants within the picking zone 35. During such movement, the plants are continually compressed against the spindles by the resilient mounting of the compressing rollers through their respective bell cranks 57 and tension springs 58. Concurrently, the rollers 52 are permitted individual lateral swinging movement so as to accommodate exceptionally large plant stalks through the picking zone 35 without damage to the branches or to immature cotton bolls thereon. This, of course, distinguishes the movable wall 55 of the present invention over the conventional compression plates which are completely unitarily moved farther away from the spindles during the passage of such obstructions through the picking zone.

In view of the foregoing, it is readily apparent that the structure of the present invention provides an improved plant compressing apparatus for cotton pickers which substantially eliminates any relative movement between the compressing wall and the plants which, in conventional structures, causes damage and loss of the immature cotton bolls thereon. The movable wall formed by the rollers in opposed relation to the picking spindles within the picking zone travels at a speed correlated to the speed of the picking unit so as to remain relatively stationary with respect to the plants to preclude any scraping or relative sliding movement therebetween. This insures that only mature cotton bolls are picked and presents a minimum of disturbance to immature cotton bolls so as dependably to preserve their attachment to the plants for subsequent picking operations. Furthermore, the structure of the present invention can be adapted for use on relatively low powered picking machines inasmuch as it provides a picking zone which presents a minimum of restriction to the movement of plants therethrough.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A plant compressing apparatus, for a mechanical cotton picker and the like adapted for earth traversing movement along rows of plants and having a housing providing an elongated passage therethrough defining a picking zone to receive such rows of plants and including a plurality of power driven picking spindles having extended ends traveled through the picking zone at a velocity substantially equal to the earth traversing velocity of the picker and in a direction opposite to the direction of such picker movement, comprising plant compressing means providing a circumferential continuous surface of revolution concentric about an axis of rotation within the housing adjacent to said picking zone in opposed relation to said picking run of the spindles to form a movable wall for substantially free movement of plants through the picking zone.

2. The plant compressing apparatus of claim 1 in which said compressing means is an elongated roller having an inner peripheral portion movable through the picking zone in the same direction as the picking run of the spindles.

3. The plant compressing apparatus of claim 2 including support means pivotally mounting the roller for swinging movement relative to the spindles within the picking zone, and resilient means biasing said support means and the roller in a direction to compress said plants in the picking zone toward the spindles.

4. A plant compressing apparatus, for a mechanical cotton picker and the like adapted for earth traversing movement along rows of plants and having a housing providing an elongated passage therethrough defining a picking zone to receive such rows of plants and including a plurality of power driven picking spindles having extended ends traveled through the picking zone at a velocity substantially equal to the earth traversing velocity of the picker and in a direction opposite to the direction of such picker movement, comprising a plurality of rollers mounted for rotation within the housing adjacent to said picking zone in opposed relation to said picking run of the spindles to form a movable wall for substantially free movement of plants through the picking zone.

5. The plant compressing apparatus of claim 4 in which said rollers are mounted on successively equally spaced substantially parallel upright axes having tangentially aligned inner peripheral portions lying in a common plane adjacent to said picking zone, and drive means interconnecting said rollers for movement of their inner peripheral portions through the picking zone in the same direction and velocity is the picking run of the spindles.

6. In a mechanical picker adapted for earth traversing movement along rows of plants having a housing providing a passage therethrough defining a picking zone to receive such rows of plants, a plurality of picking spindles mounted for circuitous movement and having a picking run directed rearwardly through the passage in a direction opposite to the direction of picker movement, means for driving the spindles through the passage at a velocity substantially corresponding to the earth traversing velocity of the picker; a plant compressing apparatus comprising a plurality of rollers mounted within the housing on successively equally spaced substantially parallel upright axes having tangentially aligned peripheral portions lying in a common plane adjacent to said picking zone of the passage in opposed relation to said picking run of the spindles to form a movable wall for substantially free movement of plants through the picking zone, a plurality of arms pivotally mounted in the housing individually supporting the rollers for swinging movement of the rollers relative to the spindles within the picking zone, and resilient means biasing said arms in a direction to compress said plants in the picking zone toward the spindles.

7. The plant compressing apparatus of claim 6 in which said arms are bell cranks having opposite angularly related ends individually pivotally mounted intermediate their ends on the housing with said rollers being individually rotatably mounted on one end of the bell cranks, a plurality of tension springs individually connected between the opposite ends of the bell cranks and the housing, and a plurality of stop members on the housing in interfering individual abutting relation with said opposite ends of the bell cranks to limit outward travel of the rollers farther into the picking zone.

References Cited
UNITED STATES PATENTS

| | | | |
|---|---|---|---|
| 1,910,307 | 5/1933 | Rust | 56—43 |
| 2,513,259 | 6/1950 | Walker | 56—30 |
| 2,836,951 | 6/1958 | Annis | 56—30 |
| 2,680,341 | 6/1954 | Haring | 56—40 |
| 3,039,258 | 6/1962 | Cafaro | 56—49 |
| 3,312,047 | 4/1967 | Cafaro | 56—48 |

RUSSELL R. KINSEY, *Primary Examiner.*